US007708957B2

(12) United States Patent
Reid

(10) Patent No.: US 7,708,957 B2
(45) Date of Patent: May 4, 2010

(54) THERMALLY STABLE CERAMIC MEDIA FOR USE IN HIGH TEMPERATURE ENVIRONMENTS

(75) Inventor: John Stewart Reid, Wooster, OH (US)

(73) Assignee: Saint-Gobain Ceramics & Plastics Inc., Worcester, MA (US)

( * ) Notice: Subject to any disclaimer, the term of this patent is extended or adjusted under 35 U.S.C. 154(b) by 0 days.

(21) Appl. No.: 12/080,883

(22) Filed: Apr. 7, 2008

(65) Prior Publication Data

US 2008/0187470 A1 Aug. 7, 2008

Related U.S. Application Data

(62) Division of application No. 11/325,825, filed on Jan. 5, 2006, now Pat. No. 7,354,879.

(51) Int. Cl.
- *B01J 8/02* (2006.01)
- *B01J 19/00* (2006.01)
- *C04B 38/00* (2006.01)
- *C04B 35/04* (2006.01)

(52) U.S. Cl. .................. 422/211; 422/240; 501/80; 501/94; 501/108; 501/118; 501/119; 501/122; 501/133; 501/141; 501/144; 501/153; 501/154

(58) Field of Classification Search .............. 422/211, 422/240; 501/80, 94, 108, 118, 122, 133, 501/153, 154, 119, 141, 144
See application file for complete search history.

(56) References Cited

U.S. PATENT DOCUMENTS

| 4,703,022 | A * | 10/1987 | Johnson ................. 501/95.1 |
| 5,755,569 | A * | 5/1998 | Berg et al. ................ 432/181 |
| 6,003,305 | A * | 12/1999 | Martin et al. ............. 60/274 |
| 6,321,462 | B1 * | 11/2001 | Seidl et al. ................ 34/423 |
| 6,710,001 | B2 * | 3/2004 | Watanabe et al. .......... 501/155 |
| 6,800,242 | B2 * | 10/2004 | Cao ....................... 264/660 |
| 6,824,328 | B1 * | 11/2004 | Vinegar et al. .......... 405/128.4 |
| 2002/0037798 | A1 * | 3/2002 | Watanabe et al. ........... 501/80 |
| 2004/0180777 | A1 * | 9/2004 | Cao ....................... 501/118 |
| 2005/0111917 | A1 * | 5/2005 | Vinegar et al. .......... 405/128.4 |
| 2006/0073430 | A1 * | 4/2006 | Chiles et al. ................. 431/3 |
| 2006/0093975 | A1 * | 5/2006 | Baker et al. ................. 431/5 |
| 2006/0121403 | A1 * | 6/2006 | Thornton ................. 431/356 |

* cited by examiner

*Primary Examiner*—Walter D Griffin
*Assistant Examiner*—Huy-Tram Nguyen
(74) *Attorney, Agent, or Firm*—Stewart A. Fraser; Thomas G. Field, III

(57) ABSTRACT

A chemical processing apparatus that utilizes a ceramic media sintered at a lower temperature than the apparatus' maximum exposure temperature is described. The media's physical and chemical properties may contribute to its thermal stability when exposed to temperatures that exceed the media's sintering temperature by at least 50° C.

12 Claims, 3 Drawing Sheets

US 7,708,957 B2

THERMALLY STABLE CERAMIC MEDIA FOR USE IN HIGH TEMPERATURE ENVIRONMENTS

CROSS-REFERENCE TO RELATED APPLICATION

This application is a divisional of prior application Ser. No. 11/325,825, now U.S. Pat. No. 7,354,879, filed on Jan. 5, 2006, the disclosure of which is incorporated by reference.

BACKGROUND OF THE INVENTION

This invention generally relates to ceramic media for use in environments wherein the media is exposed to an ambient temperature that is greater than the temperature at which the media was sintered. More particularly, this invention is concerned with ceramic media that are sintered at 1250° C. or less and then used in a chemical processing apparatus, such as a reactor, having an internal temperature greater than 1300° C.

BRIEF SUMMARY OF THE INVENTION

The inventor has discovered that particular ceramic media that are manufactured, for example, within a certain range of chemical formula and have certain physical characteristics, can be produced by sintering the media's greenware at a relatively low temperature, such as less than 1250° C., and the sintered product is physically stable after extended exposure to temperatures, such as 1300° C. or higher, which are greater than the sintering temperature.

In one embodiment, this invention may be a chemical processing apparatus comprising a plurality of ceramic media that were formed at a known sintering temperature. The media are physically distinct and readily separable from one another after thermal cycling in the apparatus from a first temperature that is less than the media's sintering temperature to a second temperature which is at least 50° C. higher than the media's sintering temperature and then back to the first temperature.

In another embodiment, this invention is ceramic media having a first volume and a second volume. The first volume corresponds to the volume of the media at 22° C. after heating the media to at least 1200° C. but prior to heating the media above 1250° C. The second volume corresponds to the volume of the media at 22° C. after heating the media above 1300° C. but less than 1500° C. The ratio of the second volume to the first volume is between 0.9:1 and 1:1.

In another embodiment, this invention is a process for manufacturing ceramic media. In one step, a mixture of magnesium oxide, ball clay, bentonite and feldspar is provided. The magnesium oxide is in particulate form and at least 45 percent by weight of the magnesium oxide particles are between 30 and 250 microns. The mixture is formed into a plurality of three dimensional media. The media is then heated to a sintering temperature greater than 1200° C. and less than 1250° C. The porosity of the sintered media is greater than 24 percent and less than 38 percent based on the apparent volume of the media. The media's major phase, as determined by x-ray diffraction analysis, is MgO.

In yet another embodiment, this invention is a ceramic media that includes MgO, $SiO_2$ and $Al_2O_3$. The MgO is between 48 and 78 percent by weight of the media. The $SiO_2$ is between 5 and 30 percent by weight of the media. The $Al_2O_3$ is between 5 and 30 percent by weight of the media. The media is between 24 and 38 percent porous based on the apparent volume of the media and the media's major phase, as determined by x-ray diffraction analysis, is MgO.

DETAILED DESCRIPTION OF THE INVENTION

Figure 1:
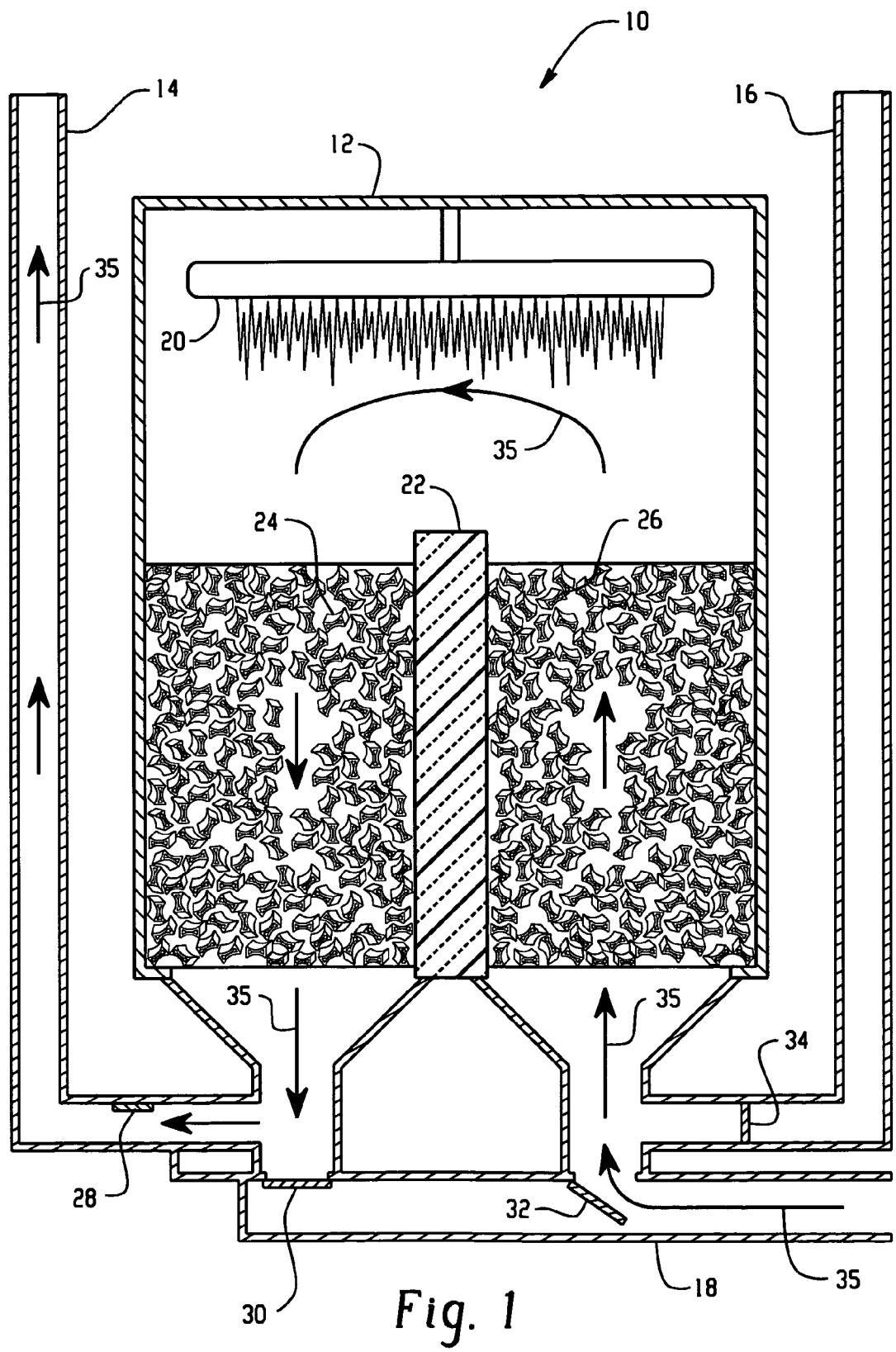
FIG. 1 is a simplified cross-sectional view of a thermal oxidizer with gas flowing in a first direction.

As used herein, the phrase "chemical processing apparatus" is intended to describe equipment, such as tanks, burners, combustion chambers, piping, etc, that receives a raw material and then chemically and/or physically converts it to an end product that is discharged from the apparatus. The conversion may involve a chemical reaction, a physical change (e.g. liquid to gas) to the raw material's state of matter and/or an increase or decrease in the temperature of the raw material. Chemical reactors, such as thermal oxidizers, are widely used in chemical manufacturing industries for a variety of purposes and are considered to be a subset of the phrase chemical processing apparatus.

Ceramic media are used in a wide variety of chemical processing apparatus that are part of various industrial processes. In some processes, the media stabilize or moderate the temperature in the processing equipment by acting as a heat sink that can readily absorb heat from a concentrated source of heat and then slowly release the heat as needed. In other processes, the media may participate in the transfer of heat during the process cycle. In yet other processes, the media's primary function may be to provide structural support for other components and/or material within the equipment. The processing equipment may employ a single collection of media, comprising thousands of individual pieces of the ceramic media, or the equipment may utilize two or more collections of media. A collection of media may be referred to as a "bed" of media. Thermal oxidizers, for example, are a well known category of chemical reactors that utilize two collections of ceramic media to efficiently transfer heat within the oxidizer. Two well known classes of thermal oxidizers are flameless thermal oxidizers (FTO) and regenerative thermal oxidizers (RTO). Thermal oxidizers are used in a variety of industrial processes including the destruction of harmful organic compounds which are also known as volatile organic compounds (VOC). Thermal oxidizers use natural gas to fuel combustion zones that oxidize the organic compounds. In order to minimize the cost of operating the thermal oxidizer, the oxidizer includes a heat transfer media that conserves energy by absorbing heat that is generated during one portion of the process cycle and then releasing it for use at a later time in the process cycle. As used herein, heat transfer means extracting heat from one flow of material and then releasing the captured heat into a different flow of material. Typically, the media includes a plurality of identically shaped ceramic components that were formed and then sintered in a kiln. The media must be chemically and physically stable when subjected to the high temperatures that a chemical processing apparatus may experience during an unintentional thermal excursion, an intentional and sustained exposure to high temperatures, rapid changes in pressure and/or an aggressive chemical environment. To be commercially viable, the media may be: (1) made from low cost raw materials; (2) sintered in a kiln with a low sintering temperature; (3) resistant to excessive shrinkage when heated above the media's sintering temperature and (4) possible to manufacture using a conventional forming operation.

In addition to use in a chemical reactor as described above, ceramic media may be used in chemical reactors, such as catalytic reactors, which are available in various shapes and sizes. A catalytic reactor may need two or more distinct layered collections of ceramic media disposed within the reactor. For example, a first layer of ceramic layer may be disposed at the bottom of the reactor to act as a bed support media. The support media serves to physically support and protect catalyst and absorbent beds from gas flows at various pressures, temperatures and rates of flow. Commercially viable support media must have a high impact resistance so that they do not break on handling during loading into a reactor and they must also have the ability to withstand rapid changes in pressure. A second layer of media rests upon the first layer. The second layer of media, which is usually physically and chemically distinct from the first layer of media, may function as a carrier onto which a thin discontinuous layer of catalytic material, such as silver or titanium, has been deposited. The catalytic material catalyzes the desired chemical reaction within the reactor. An optional third layer of media may be deposed on top of the second layer. The media in the third layer is usually physically and chemically distinct from the media in the first and second layers. The function of the third layer is to filter contaminants from an incoming source of raw material before the contaminants can contact and foul the catalytic material in the second layer. While the exact chemical compositions, structures and functions of the media in the three layers are distinct from one another, all of the media must be able to withstand exposure to environments having a temporary and/or sustained exposure to high temperatures that are higher than the temperature at which the media was sintered.

Many commercially available thermal reactors are routinely operated between 800° C. and 1000° C. Unfortunately, "hot spots" in the reactor may expose the ceramic media disposed within the reactor to temperature excursions in excess of 1300° C. One way to insure the stability of conventional heat transfer ceramic media at temperatures above 1300° C. is to manufacture the media by sintering them in a kiln that has an operating temperature that equals or exceeds the highest temperature that the media will experience while in the reactor. Therefore, if the maximum temperature in the reactor is 1500° C., the media may be sintered at 1500° C. or higher. However, sintering the media at temperatures in excess of 1500° C. requires more energy than sintering the media at a lower temperature. Any increase in the amount of energy needed to sinter the media is undesirable because it increases the cost of manufacturing the media.

Referring now to the drawings and more particularly to FIG. 1, there is shown a cross-sectional view of a chemical processing apparatus, more specifically a thermal oxidizer, 10 of this invention. Beginning with the exterior of the oxidizer, the oxidizer's components are housing 12, exhaust stacks 14 and 16, and inlet manifold 18. Disposed within the housing are, burner 20, insulating wall 22, a first collection of heat exchange media 24 and a second collection of heat exchange media 26. Valves 28, 30, 32 and 34 control the flow of gases into and out of the thermal oxidizer. The gas flowing into the thermal oxidizer is considered to be a raw material. The gas may be a volatile organic compound (VOC) or other stream which needs to be oxidized, for example, because it is considered to be an environmental hazard. In one embodiment, the thermal oxidizer may be used to convert a VOC to one or more compounds that can be safely released to the environment. The thermal oxidizer may use any heat source sufficient to produce the desired oxidation. The thermal oxidizer is designed to use a combustible material, such as natural gas, to generate the heat that is needed to destroy a VOC. While the heat entrained in the oxidizer's byproducts could be allowed to flow through the oxidizer, the cost effectiveness of the thermal oxidizer's operation is improved significantly if heat exchange media are used to capture and utilize the heat that would otherwise be wasted.

Figure 2:
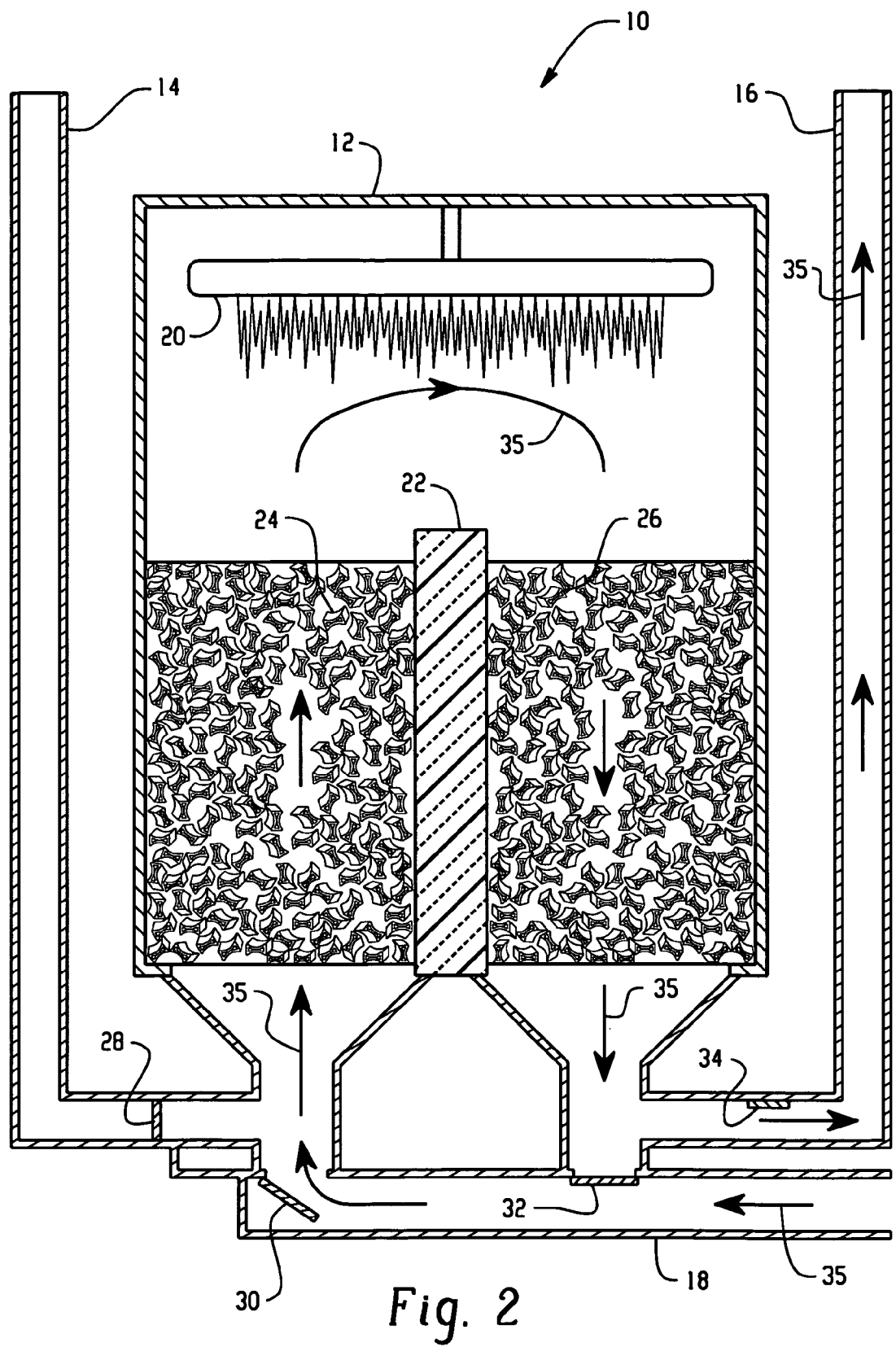
FIG. 2 is a simplified cross-sectional view of a thermal oxidizer with gas flowing in a second direction.

The operation of a thermal oxidizer using ceramic media according to one embodiment of this invention will now be explained. FIG. 1 represents a first portion of the process cycle in which valves 28 and 32 are opened and valves 30 and 34 are closed thereby controlling the flow of the VOC from the inlet manifold, through the thermal oxidizer and out of the thermal oxidizer via the exhaust stack 14. See arrows 35 in FIG. 1. As the gas flows through the thermal oxidizer it is heated by the burner thereby converting the VOC to other compounds that can be safely discharged into the environment. As the heated gaseous byproducts flow through the first collection of heat exchange media 24 and out of exhaust stack 14, the heat in the combustion products is absorbed by media 24. With reference now to FIG. 2, after a predetermined period of time, valves 28 and 32 are closed and valves 30 and 34 are opened thereby forcing the gas to enter the thermal oxidizer by flowing through the heated first collection of heat exchange media which releases the heat that had been captured in the first portion of the process cycle thereby increasing the temperature of the VOC before it reaches the burner. By using the captured heat to preheat the VOC, the amount of energy needed to combust the VOC is lowered thereby reducing the cost of operating the oxidizer. As the heated byproducts flow through the second collection of heat exchange media 26, the entrained heat is extracted by the media 26 and the byproducts exit the oxidizer's housing via exhaust stack 16. The thermal oxidizer continues to operate by once again closing valves 30 and 34 while opening valves 28 and 32 thereby forcing the VOC to flow through the second collection of heat transfer media where the VOC is preheated before flowing past the burner. By cycling back and forth between the process steps represented by FIGS. 1 and 2, the thermal oxidizer converts the VOC to harmless materials in a cost efficient manner.

Thermal oxidizers are typically designed to be operated within a specified temperature range that is determined, in part, by the properties of the material flowing into the oxidizer, the desired reaction products, the quantity of material to be processed, etc. For many applications the oxidizer's normal operating temperature range is between 800° C. and 1000° C. However, the thermal oxidizer may experience unintentional thermal excursions well above 1000° C. such as 1300° C. or even 1500° C. The unexpected increase in temperature could occur throughout the mass of heat exchange media in the oxidizer or the temperature excursion could be limited to localized hot spots. When exposed to temperatures above 1300° C., conventional ceramic media are known to fuse to one another which may lead to unacceptable conditions in the oxidizer such as an increase in the pressure drop across the bed of heat exchange media. Consequently, to insure normal operation of the oxidizer traditional heat transfer media must be physically and thermally stable at temperatures above 1300° C. When traditional heat exchange media made from a ceramic material was used in thermal oxidizers operated between 800° C. and 1000° C. the media was manufactured by firing it at a temperature that exceeded the thermal oxidizer's maximum exposure temperature. By firing the media at a temperature that exceeded the oxidizer's maximum exposure temperature, the thermal stability of the media while in the oxidizer was improved. However, as explained earlier, firing the media at a lower temperature than the oxidizer's exposure temperature is desirable because the cost to produce the media decreases as the firing temperature of the media is reduced. When embodiments of the thermally stable media of this invention are produced by firing the media between 1200° C. and 1250° C. and then used in a thermal oxidizer that experiences a thermal excursion between 1300° C. and 1500° C., the difference between the media's firing temperature and the oxidizer's excursion temperature is at least 50° C. and could be as great as 300° C. Temperature differentials of 75° C., 100° C., 150° C., 200° C. and 250° C., as well as other differentials between 50° C. and 300° C. are also feasible.

If needed, a chemical processing apparatus can be designed to operate for sustained periods of time at temperatures in excess of 1300° C. Some applications may require the ceramic media to remain thermally stable after exposure to the apparatus' maximum exposure temperature of 1300° C. or higher for two hours, twenty-four hours, four weeks, six months or other periods of time depending upon the application. Regardless of the amount of time that the media is exposed to high temperatures, the media of this invention may remain physically distinct and readily separable from one another after thermal cycling in a chemical processing apparatus whose internal temperature fluctuates between a first temperature that is less than the temperature at which the media was sintered to a second temperature which is at least 50° C. higher than the media's sintering temperature and then back to the first temperature or lower. For example, if the media's sintering temperature is 1250° C., the individual members of the media in the chemical processing apparatus may remain physically distinct and readily separable from one another after the apparatus' internal temperature rises from a first temperature, which is less than 1250° C., to a second temperature, which is greater than 1300° C. and then cools down to a temperature less than 1250° C. As stated above, the amount of time that the media is desired to be able to withstand exposure to the second temperature or higher may vary depending upon the design parameters of the chemical processing apparatus.

Figure 3:
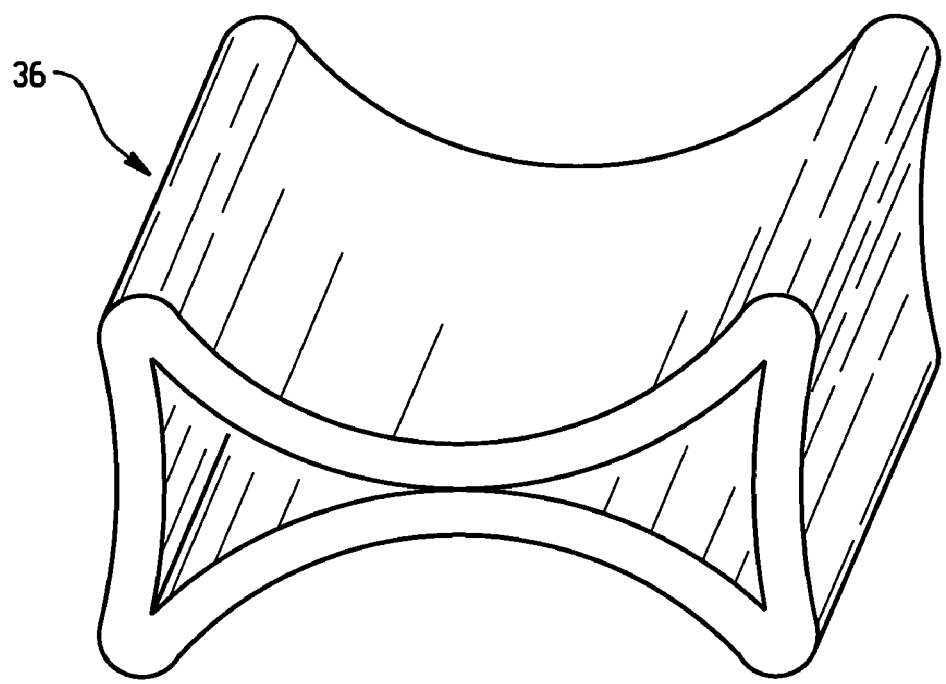
FIG. 3 shows a typical shape of ceramic media used in a thermal oxidizer.

Ceramic media of the present invention may be of any shape that allows the media to function as desired for a given application. FIG. 3 shows the shape of one embodiment of a heat transfer media 36 that is suitable for use in a thermal oxidizer of this invention. Media 36 may be formed by using the formula described below in Example 4. Other shapes of suitable ceramic media are disclosed in numerous patents including U.S. Pat. No. 5,304,423 and U.S. Pat. No. 6,007,915. If the media of this invention is used as a bed support media in a chemical processing apparatus that produces ethylene oxide, the media may be spherically shaped.

Figure 4:
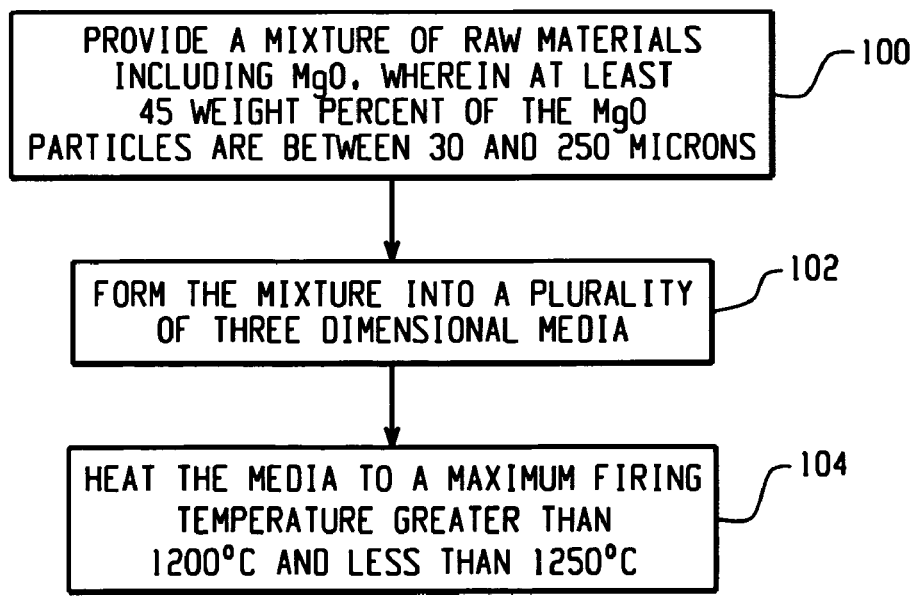
FIG. 4 shows the process steps used to produce media of one embodiment of this invention.

FIG. 4 shows process steps used to produce media according to one embodiment of this invention. In step 100, a mixture of raw materials is provided. The mixture includes magnesium oxide in particulate form and having a particle size distribution wherein at least 45 weight percent of the magnesium oxide particles are between 30 and 250 microns. The mixture also includes ball clay, bentonite and feldspar. In step 102, the mixture is then disposed into an extruder which generates a continuous, elongated and shaped body of formed extrudate which is then cut and/or otherwise shaped into discrete three dimensional unfired media. In step 104, the shaped and unfired media is heated to a sintering temperature that is greater than 1200° C. and less then 1250° C. The porosity of the sintered media is greater than 24 percent and less than 38 percent based on the apparent volume of the media and the media's major phase, as determined by x-ray diffraction analysis, is MgO.

The raw materials that are included in the mixture can vary in their physical and chemical characteristics provided the sintered media has the desired physical and thermal stability at temperatures that exceed the media's sintering temperature by at least 50° C. With regard to the selection of an appropriate source of magnesium oxide, preferably at least 25 percent of the magnesium oxide particles are larger than 250 microns and 30 percent of the particles are smaller than 30 microns. To minimize the cost of the magnesium oxide and therefore the final cost of the sintered media, a preferred source of commercially available magnesium oxide is between 90 and 95 weight percent MgO based on a chemical analysis. At least 5 weight percent, more preferably 8 weight percent, of the magnesium oxide may be one or more of the following compounds: CaO, $Al_2O_3$, $SiO_2$ and $Fe_2O_3$. The use of a source of magnesium oxide that is more than 95 weight percent MgO is possible but not preferred because the cost of the MgO increases as the purity of the material increases thus causing an unnecessary increase in the cost of the fired media.

A preferred source of ball clay has an $Al_2O_3$ content between 25 and 35 weight percent, an MgO content less than 2 weight percent and a median particle size of about 0.4 microns. A preferred source of betonite has an $Al_2O_3$ content of about 21 weight percent and an MgO content less than 4 percent. A preferred feldspar has a particle size of about 15 microns and at least 9 weight percent $Na_2O$ and $K_2O$ based on the weight of the feldspar.

The sintered media of this invention can have a variety of specific chemical compositions provided each of the compounds specified below is present within the following ranges: MgO is between 48 and 78 weight percent; $Al_2O_3$ is present between 5 to 30 weight percent; $SiO_2$ is present between 5 to 30 weight percent; and other oxides account for not more than 8 percent by weight. Minor amounts of other materials, such as processing aids to improve the efficiency of the media manufacturing process, may also be present. Optionally, the sintered media of the invention consists essentially of 48 and 78 weight percent MgO; 5 to 30 weight percent $Al_2O_3$; and 5 to 30 weight percent $SiO_2$.

One performance characteristic of media of this invention is the media's ability to maintain its physical stability after exposure to a sustained or brief exposure to a temperature in a chemical processing apparatus which exposes the media to a higher temperature than the temperature at which the media was sintered. Physical stability, as used herein, is determined as follows. First, measure the apparent volume of the media after the media has been sintered between 1200° C. and 1250° C. for at least two hours and then allowed to cool to room temperature, which is defined for use herein as 22° C. This apparent volume, which is measured using a dry media pycnometer from Micromeritics GeoPyc (model 1360), is defined as the media's first volume. Then heat the media to a maximum temperature between 1300° C. and 1500° C. for four hours and allow the media to cool once again to 22° C. Next, measure the apparent volume of the sintered media which is defined herein as the media's second volume. If the ratio of the media's second volume to the media's first volume is between 0.9:1 and 1:1, then the media is considered to be thermally stable. Preferably, the ratio of the second volume to the first volume is between 0.95:1 and 1:1. More preferably, the ratio is between 0.98:1 and 1:1.

While the reasons for the thermal stability of the media may not be completely understood, one of the media's physical characteristics that is believed to be significant to achieving the desired thermal stability is the arrangement of particles within the media. Another characteristic that may be significant is the porosity of the sintered media which is believed to be impacted by the particle size distribution of the magnesium oxide. The porosity of the media is determined using ASTM C 373-88 (Reapproved 1999). Preferably, the porosity of the sintered media is between 24 percent and 38 percent based on the media's apparent volume. More preferably, the porosity is between 26 percent and 36 percent. Even more preferably, the porosity is between 28 and 34 percent. Another physical characteristic of the media that is believed to be important to achieving the desired thermal stability is the crystalline phase of the sintered media. X-ray diffraction analysis of thermally stable media of this invention shows that the media's major phase is MgO. The media's minor phases may be one or more of the following crystalline phases: forsterite, spinel and calcium-magnesium-silicate.

EXAMPLE 1

To illustrate the thermal stability of the media of the present invention, several samples of disc shaped media were prepared and evaluated as follows.

The chemical and physical parameters of the raw materials are shown below in Tables 1A and 1B. First, a mixture was prepared by weighing 66 parts dead burned magnesium oxide having the chemical analysis shown in Table 1A and the particle size distribution shown in Table 1B, along with 10 parts of magnesium oxide having the same chemical analysis but with a different particle size distribution (see Table 1B) and 12 parts each of materials of a first commercially available clay and a second commercially available clay having the chemical analyses shown in Table 1A and the same particle size distribution as shown in Table 1B. These dry powders were dry blended in a high intensity mixer until they were homogenously blended. Several 9 gram quantities of this mixture were then each pressed in a 2.54 cm diameter steel die to a pressure of 6,900 N/m². The disc shaped samples were then fired at 1225° C. for three hours. The samples were then cooled and the density was determined using a weighing scale and a dry media pycnometer from Micromeritics GeoPyc (model 1360) to measure the volume. The disc's volume is defined herein as the disc's first volume. The average density of the samples after firing to 1225° C. and then cooling to room temperature was 2.265 g/cc. When the same samples were reheated to 1375° C. for three hours and then allowed to cool to 22° C., the weights and volumes were measured and the average density was 2.29 g/cc. The disc's volume after heating to 1375° C. and then cooling is defined herein as the disc's second volume. Because the weight of the samples did not change, the ratio of the second volume to the first volume was 0.99:1.

TABLE 1A

|  | Magnesium Oxide | First Clay | Second Clay |
|---|---|---|---|
| SiO$_2$ | 3.6 | 64.52 | 67.25 |
| Al$_2$O$_3$ | 1.1 | 28.80 | 22.5 |
| Fe$_2$O$_3$ | 1.2 | 1.83 | 3.47 |
| TiO$_2$ | 0.2 | 1.69 | 0.17 |
| CaO | 1.2 | 0.22 | 0.69 |
| MgO | 92.5 | 0.41 | 2.85 |
| Na$_2$O | 0.1 | 0.23 | 2.74 |
| K$_2$O | 0.1 | 2.30 | 0.33 |

TABLE 1B

|  |  | Magnesium Oxide | First Clay | Second Clay |
|---|---|---|---|---|
|  | % by wt ⇒ | 66 | 10 | 12 | 12 |
| * | % < 1μ |  |  | 57 | 57 |
|  | % < 5μ |  | 5 | 88 | 88 |
|  | % < 10μ |  | 10 | 96 | 96 |
|  | % < 30μ |  | 32 | 98 | 98 |
|  | % < 50μ | 70 | 47 | 100 | 100 |
|  | % < 100μ | 82 | 60 |  |  |
|  | % < 150μ | 92 | 62 |  |  |
|  | % < 250μ | 94 | 75 |  |  |
|  | % < 350μ | 99 | 87 |  |  |

* indicates particle size distribution in weight percent

EXAMPLE 2

Additional examples were made using the formula in Example 1 except that water, which accounted for 16 percent by weight of the mixture, was added to the dry ingredients to create a mixture with the proper consistency for forming the media into the desired shape by an extrusion process. The use of other forming processes, such as pressing or slip casting, is also possible. The specific shape of the media was comparable to the media shown in FIG. 3. The dimensions of the media were 42 mm in length, 28 mm in width, 12 mm thick and a 4.5 mm wall thickness. The extruded samples were fired to 1235° C., allowed to cool to room temperature and the density was determined to be 2.23 g/cc. The media's first volume was 6.50 cc. The porosity of the media was 32%. Several samples were re-heated to 1316° C., disposed into a refractory sagger with a 33.0 kg load of the same area positioned on top of the media for five hours. After allowing the media to cool, an inspection of the media revealed that they had neither deformed nor fused together. The media's density was 2.28 g/cc and the second volume was 6.36 cc. The ratio of the second volume to the first volume was 0.98:1.

EXAMPLE 3

Approximately 1320 kg of the media described in Example 2 were manufactured and sintered in a kiln with a maximum firing temperature of 1215° C. The media was characterized by x-ray diffraction and the major phase was MgO. Minor phases that were present included forsterite, spinel and calcium-magnesium-silicate. The media were separated into groups that were re-heated to 1400° C. for ten hours, or 1510° C. for ten hours or 1316° C. for several days. Inspection of the media after cooling revealed that the media did not deform nor fuse together during the reheating. The media were physically distinct and readily separable from each other without the use of a tool or excessive manual force.

EXAMPLES 4 AND 5

Examples 4 and 5 are comparative examples that illustrate the unique thermal stability of the claimed invention by providing data that demonstrate the thermal instability of conventional disc shaped media that were made using magnesium oxide based material and following a formula that was obtained from published literature. Disc shaped samples were made using the technique described in Example 1. Analysis of the media by x-ray fluorescence revealed the following compositions.

TABLE 2

|  | Example 4 | Example 5 |
|---|---|---|
| $SiO_2$ | 12.2 | 39 |
| $Al_2O_3$ | 5.88 | 9.8 |
| $Fe_2O_3$ | 0.73 | 0.81 |
| $TiO_2$ | 0.17 | 0.3 |
| CaO | 2.96 | 1.92 |
| MgO | 77.36 | 47.29 |
| $Na_2O$ | — | — |
| $K_2O$ | 0.3 | 0.73 |

The particle size distributions of the raw materials used in example 4 are shown in Table 3.

TABLE 3

|  | Magnesium Oxide | Clay | Silica | Dolomitic Limestone | $Al_2O_3$ | $Na_2O$ | $K_2O$ |
|---|---|---|---|---|---|---|---|
| % by wt | 40 | 38 | 7 | 7 | 3 | 3 | 1 | 1 |
| % < 1µ |  | 3 | 57 |  |  |  |  |
| % < 5µ | 15 | 14 | 88 | 19 |  | 30 |  |  |
| % < 10µ | 28 | 20 | 96 | 40 |  | 60 |  |  |
| % < 30µ | 68 | 49 | 98 | 87 |  | 93 |  |  |
| % < 50µ | 90 | 78 | 100 | 97 |  | 98 |  |  |
| % < 100µ | 98 | 86 |  | 99 |  | 100 |  |  |
| % < 150µ | 99 | 88 |  | 100 | 99 |  | 99 | 99 |
| % < 250µ |  | 89 |  |  |  |  |  |  |
| % < 350µ |  | 90 |  |  |  |  |  |  |

* indicates particle size distribution in weight percent

Discs made according to the formula in example 4 were fired to 1235° C. and allowed to cool so that the discs' first volume could be measured. The discs were re-fired to 1400° C. and then allowed to cool so that the discs' second volume could be measured. Due to a decrease in the volume of the discs after heating to 1400° C., the ratio of the second volume to the first volume was 0.66:1. The reason for the significant reduction in volume is believed to be due to the use of raw materials having a finer particle size than the raw materials used in example 1.

Discs made according to the formula in example 5 were fired at 1235° C. and then heated to 1400° C. using the procedure described above. The discs' first and second volumes were measured. The ratio of the second volume to the first volume was 0.73:1. The chemical formula and particle size distributions of the raw materials used in example 5 are shown below in Table 4.

TABLE 4

|  | Magnesium Oxide | Clay | Silica | Dolomitic Limestone | $Al_2O_3$ | $K_2O$ | $Mg_2SiO_4$ |
|---|---|---|---|---|---|---|---|
| % by wt | 20 | 23 | 15 | 20 | 2 | 5 | 1 |
| % < 1µ |  | 3 | 57 |  |  |  |  |
| % < 5µ | 15 | 14 | 88 | 19 |  | 30 |  |
| % < 10µ | 28 | 20 | 96 | 40 |  | 60 |  |
| % < 30µ | 68 | 49 | 98 | 87 |  | 93 |  |
| % < 50µ | 90 | 78 | 100 | 97 |  | 98 |  |
| % < 100µ | 98 | 86 |  | 99 |  | 100 |  |
| % < 150µ | 99 | 88 |  | 100 | 99 |  | 99 | 99 |
| % < 250µ |  | 89 |  |  |  |  |  |
| % < 350µ |  | 90 |  |  |  |  |  |

* indicates particle size distribution in weight percent

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

I claim:

1. A chemical processing apparatus comprising a plurality of ceramic media formed at a sintering temperature, said media arc physically distinct and readily separable from one another after thermal cycling in the apparatus from a first temperature that is less than the media's sintering temperature to a second temperature which is at least 50° C. higher than the media's sintering temperature and then back to the first temperature, wherein said media comprises MgO, $SiO_2$ and $Al_2O_3$, said MgO is between 48 and 78 percent by weight, said $SiO_2$ is between 5 and 30 percent by weight and said $Al_2O_3$ is between 5 and 30 percent by weight of said media and wherein said media's porosity is between 24 percent and 38 percent based on media's apparent volume.

2. The chemical processing apparatus of claim 1 wherein said media's sintering temperature is greater than 1200° C. and less than 1250° C.

3. The chemical processing apparatus of claim 1 wherein said second temperature is at least 1300° C.

4. The chemical processing apparatus of claim 1 wherein said second temperature is at least 1400° C.

5. The chemical processing apparatus of claim 1 wherein the difference between said media's sintering temperature and said second temperature is at least 75° C.

6. The chemical processing apparatus of claim 1 wherein the difference between said media's sintering temperature and said second temperature is at least 100° C.

7. The chemical processing apparatus of claim 1 wherein the difference between said media's sintering temperature and said second temperature is at least 150° C.

8. The chemical processing apparatus of claim 1 wherein the difference between said media's sintering temperature and said second temperature is at least 200° C.

9. The chemical processing apparatus of claim 1 wherein the difference between said media's sintering temperature and said second temperature is at least 250° C.

10. The chemical processing apparatus of claim 1 wherein said apparatus is a flameless thermal oxidizer.

11. The chemical processing apparatus of claim 1 wherein said apparatus is a regenerative thermal oxidizer.

12. The chemical processing apparatus of claim 1 wherein said media's major phase, as determined by x-ray diffraction analysis, is MgO.

* * * * *